ized in Peoria,
UNITED STATES PATENT OFFICE.

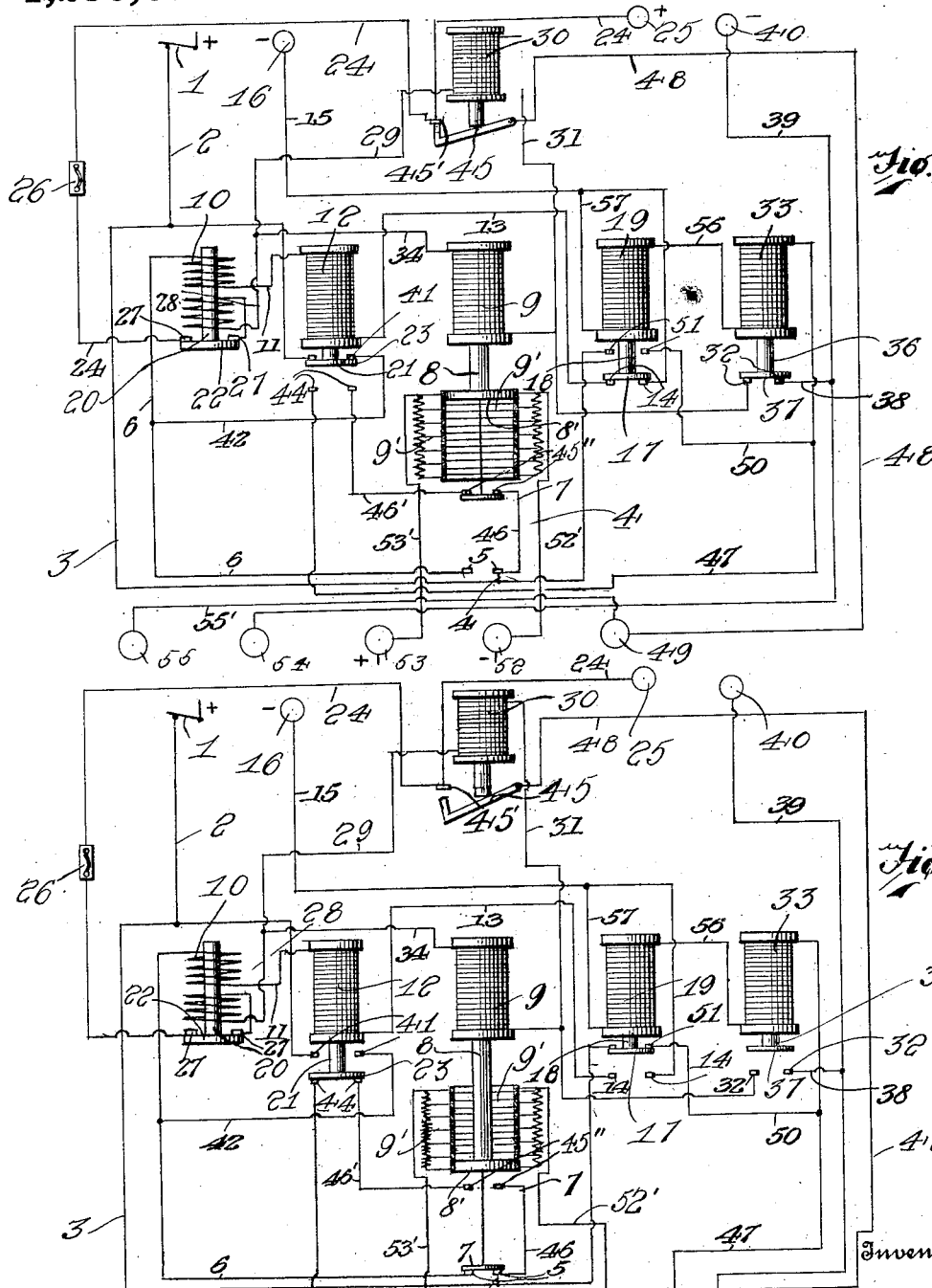

HERMAN PAULI, OF PEORIA, ILLINOIS.

AUTOMATIC CONTROLLER.

1,250,641.  Specification of Letters Patent.  Patented Dec. 18, 1917.

Application filed October 24, 1914. Serial No. 868,444.

*To all whom it may concern:*

Be it known that I, HERMAN PAULI, a citizen of the United States, residing at Peoria, in the county of Peoria and State of Illinois, have invented certain new and useful Improvements in Automatic Controllers, of which the following is a specification.

This invention relates to controlling switches and systems for electrical translating devices, and particularly to controlling systems and switches which are utilized for so controlling electric motors that they may be started from rest and brought to operating speed automatically and under such conditions as to avoid injury to either the motor or the starting apparatus.

The principal object of this invention is the production of a controlling system for electric motors in which a suitable push button or master switch may be operated for forming a circuit for operating a motor as long as desired and then when the button or master switch is again moved different circuits will be formed from those originally formed whereby the motor will be brought to rest.

With the above and other objects in view this invention consists of certain novel combinations, constructions and arrangements of parts as will be hereinafter fully described and claimed.

In the accompanying drawings:—

Figure 1 is a side view of the controlling device, partially in section, showing the circuits diagrammatically and illustrating the circuits when the electric motor is in operation.

Fig. 2 is a view similar to that illustrated in Fig. 1 and showing the circuits formed for stopping the electric motor.

It should first be understood that during the complete operation of this automatic controller system there will be formed four control circuits, an auxiliary circuit, a motor circuit, and an auxiliary motor circuit. Furthermore, it should be understood that there are two electric feeds for the system which comprise the push button switch 1 and terminal 16 for the control circuits, and 25 and 40 for the auxiliary circuit and the auxiliary motor circuit. The terminals 55, 54, 53, 52, and 49 are connected to a suitable motor and are to supply the electric current thereto for operating the same. The motor current flows from the terminal 53, over the conductor 53', to the resistance 9'. At this time the movable plate 8' carried by the core 8 of the accelerating magnet 9 will be carried at the lowest portion of the resistance, thereby causing the electrical current to pass through the entire resistance 9' before flowing over the conductor 52', to the terminal 52 and into the motor. Furthermore, it is intended to have this resistance 9' of sufficient strength to decrease the force of the current to such an extent as to prevent the same from starting the motor. It will be seen that the current which flows through the resistance 9' goes from the terminal 53 over the conductor 53' through the resistance 9' and over the conductor 52' to the terminal 52. It is, of course, obvious however, that as the plate 8' is moved upwardly it will cut out the resistance and thus cause the current to flow more directly to the motor until the resistance is entirely cut out, at which time the motor will be running at full speed. As the plate 8' again moves toward the lower portions of the resistance, the resistance will be increased thus slowing the motor until the same finally stops. The foregoing circuit is the motor circuit which supplies the main feed to the motor and which runs the motor or finally allows the motor to stop as the resistance is increased.

The first control circuit is formed by the closing of the push button switch 1, and at this time the first control circuit will be formed as the current will flow from the push button switch 1 over the conductors 2, 3, and 4, to the fixed contact points 5. Since the plate 7 carried by the plate 8' will be resting at this time upon the points 5, since the plate 8' will be carried at the lowest portion of the resistance it will be seen that the circuit will be closed through the points 5. The current, therefore, will flow over the conductor 6 to the double wound solenoid 10, over the conductor 11, into the solenoid 12. From the solenoid 12 the current flows over the conductor 13 to the fixed contact points 14 the circuit being closed at this time by means of the plate 17 so that as the current passes over the points 14 and plate 17 it will flow over the conductor 15 to the terminal 16 and in this manner the first control circuit is formed. As the current flows through the double wound solenoid 10 to the solenoid 12 it will be seen that the solenoids will be energized so as to cause the cores 20 and 21 to be drawn thereinto. As the solenoids draw their cores upwardly it will be seen that the plates 22 and 23 of the cores 20 and 21 respectively will be drawn upwardly into engagement with the contact points 27 and 41, thereby forming the auxiliary circuit and the second control circuit.

As soon as the plate 22 engages the fixed points 27 the auxiliary circuit will be formed. This auxiliary circuit flows from the terminal 25, over the conductor 24, through the fuse 26, to the contact points 27. The circuit through these points being closed by the plate 22, the current will flow over the conductor 28 into the double wound solenoid 10. This current will furthermore energize the double wound solenoid sufficiently to hold the core within the same, and in this manner keep the circuit closed through the points 27. From this double wound solenoid the current flows over the conductor 29 and branches so as to form a parallel circuit. The current which flows over the conductor 29 flows into the solenoid 30 thereby energizing the same, and then flows from this solenoid 30 over the conductor 31. The other branch flowing over the conductor 29 and conductor 34 leads to the accelerating magnet 9. The current passing through the accelerating magnet 9 will energize the same and may then pass from this magnet 9 over the conductor 35 connected to the conductor 31, whereby the current will be again united and will pass to the contact points 32. In this manner it will be seen that the plate 37 will be resting upon the points 32, and, therefore, the current will pass over the conductor 38 to the conductor 39 which is connected to the terminal 40, thereby causing the complete auxiliary circuit to be formed. As the current flows through the accelerating magnet 9 it will be seen that the magnet 9 will be energized so as to draw the core 8 thereinto and as this core 8 is drawn thereinto the plate 8' will be drawn upwardly so as to cut out the resistance, whereby the motor will be gradually started and will continue to run with increasing speed until it is running at full speed, at which time the plate will be carried at the upper portion of the resistance, as shown in Fig. 1.

Furthermore, the energizing of the solenoid 30 by the auxiliary circuit will cause this solenoid to be energized so as to draw the core 35 thereinto, whereby the pivoted switch 45 will be drawn into engagement with the contact point 45' carried by the conductor 24. This switch 45 is connected to the conductor 48 so that a branch circuit will be formed which will be fed by the conductor 24. This branch circuit comprises an auxiliary motor circuit, since the conductor 48 extends to be connected to the terminal 49, while the conductor 55' connected to the terminal 55 supplies the shunt field circuit on the motor. The return for the terminals 49 and 55 is formed by the terminal 54, which is connected to the conductor 39, whereby the current will be returned to the terminal 40. At this time it will be seen that the motor will be running at full speed, since all of the resistance has been cut out, while the auxiliary circuit will energize the magnet 9 and solenoid 30 so as to retain the cores within the magnet 9 and solenoid 30, whereby the motor will be running at full speed, while the auxiliary circuit will pass over the conductor 48 to the terminals 49 and 55.

It will be seen that as the plate 8' is moved upwardly as the resistance is cut out it will elevate the plate 7, thereby breaking the circuit through the contact points 5. As this plate 7, however, moves into engagement with the points 45'', the second control circuit is formed. This second control circuit is formed without necessitating the movement of the push button switch 1, for at this time the switch 1 will be in a closed position so as to allow the current to flow over the conductor 2, to the contact points 41. Since the plate 23 is engaged by these points because of the fact that the first control circuit moves the same into engagement with the points 41, the current will pass over the points 41 and plate 23 so as to flow over the conductor 42 to the conductor 6, and then into the double wound solenoid 10. From this double wound solenoid the current will flow over the conductor 11 into the solenoid 12, and from the solenoid 12, over the conductor 13, to the points 14. The plate 17 while being in engagement with these points 14 will close the circuit so as to allow the current to flow therethrough over the conductor 15 to the terminal 16. As long as this second control circuit is continued it will be seen that the motor will be positively prevented from accidentally stopping, for at this time the second control circuit will be energizing the double wound solenoid 10 and the solenoid 12, so that the auxiliary circuit will be formed for energizing the solenoid 30 and the accelerating magnet 9. Therefore, it will be seen that the motor will continue to run being fed by means of the terminal 53 while the current will be returned by the terminal 52.

When it is desired to stop the motor the switch 1 is opened, thereby breaking the second control circuit. This action will cause the solenoid 12 to become deënergized, thus causing the plate 23 to move into engagement with the contact point 44. It is, of course, obvious that the auxiliary circuit is still closed and will energize the double wound solenoid 10 to such an exent as to retain the core 20 therein, whereby the auxiliary circuit will continue unbroken. By the closing of the switch 1 at this time the third control circuit will be formed, at which time the current will pass over the switch 1, over the conductors 2, 3, and 4 to one of the points 5. From this point the current will continue to flow over the conductor 46 to the fixed points 45' since the plate 7 will at this time be forming a circuit in connection with these points so that the current will flow from the points over the conductor 46' to the points 44, and plate 23 and will then flow over the conductor 47 to the solenoid 33. The current will then flow through the solenoid 33 over the conductor 56 into the solenoid 19 and then from the solenoid 19 over the conductor 57, to the conductor 15, and thence to the terminal 16. Thus the third control circuit will cause the solenoids 33 and 19 to be energized, whereby the core 36 of the solenoid 33 and the core 18 of the solenoid 19 will be drawn into the same, thereby causing the plates 37 and 17 to be moved upwardly. This action will cause the plate 37 to disengage the points 32 thereby breaking the auxiliary circuit which flows from the terminal 25 and returns to the terminal 40, inasmuch as it is necessary in order to form this auxiliary circuit that the plate 37 engage the points 32. As this auxiliary circuit is broken the plate 8' will move toward the lowest portion of the resistance 9' thereby causing the resistance to be increased for gradually stopping the motor. Furthermore, it will be seen that at this time the solenoid 30 will become deënergized, thus causing the pivoting switch 45 to disengage the points 45' whereby the auxiliary motor circuit and the field shunt circuit will be broken. As the switch is continued closed the plates 37 and 17 will move to their highest points, at which time the plate 17 will engage the fixed contact points 51. This action will form the fourth control circuit, and the current will flow through this circuit for positively preventing the restarting of the motor as long as the switch 1 is continued in a closed position. The current from this fourth control circuit flows from the switch 1, over the conductors 2 and 3, to the fixed points 51. As long as the current is closed through these points by means of the plate 17 which engages the same, the current will pass therefrom over the conductor 50 to the conductor 47. This conductor being connected to the solenoid 33, allows the current to flow into the solenoid 33 and then from the solenoid 33 over the conductor 56 to the solenoid 19. From the solenoid 19 the current flows over the conductor 57 to the conductor 15 and thence to the terminal 16. Thus it will be seen that the solenoids 33 and 19 will be energized for retaining the cores therein, whereby it will be impossible for the plate 19 to accidentally engage the points 32 or for the plate 17 to disengage the points 51, which would accidentally break the fourth control circuit. At this time the motor will be positively stopped and prevented from accidentally starting again and consequently the system will be in the condition disclosed in Fig. 2, for at this time the accelerating magnet 9, the double wound solenoid 10, and the solenoids 12 and 30 will be deënergized and, therefore, the plates of their cores will be in the lowest positions, as will the switch 45.

When it is again desired to start the motor, the fourth control circuit may be broken by the opening of the switch 1, which will cause the solenoids 19 and 33 to be deënergized causing their plates to move downwardly into engagement with the points 14 and 32 respectively. Then by again closing the switch 1 it will be seen that the complete operation as hereinbefore set forth will be repeated upon the successive movements of the switch 1, the different solenoids, and the accelerating magnet. Therefore, by referring to Fig. 1 the condition of the system when the motor is running at full speed is shown, while in Fig. 2 the condition of the system when the fourth control circuit is operated and the motor is positively stopped is disclosed.

From the foregoing description it will be seen that a very efficient automatic controller has been provided for starting and stopping motors, wherein the motor may be gradually started until its speed is increased to its fullest capacity, and which may be gradually stopped by the formation of the various control circuits which operate the auxiliary circuit, which in turn operates the motor circuit.

I claim:—

In the combination of a motor and an automatic controller of the class described, a motor circuit, resistance provided upon said motor circuit, an auxiliary circuit adapted to slowly eliminate said resistance, a plurality of control circuits adapted to regulate said auxiliary circuit, said auxiliary circuit branching to form a parallel circuit, a solenoid being energized by said parallel circuit so as to regulate a switch for the purpose of closing a circuit adapted to feed the shunt field circuit of the motor, a plurality of control circuits adapted to regulate said auxiliary circuit, part of said control circuits adapted to energize a plurality of solenoids for bringing into operation said auxiliary circuit and the other part of said control circuits adapted to energize a plurality of solenoids so as to keep said auxiliary circuit out of operation.

In testimony whereof I affix my signature in presence of two witnesses.

HERMAN PAULI.

Witnesses:
　Miss ANNA E. PAULI,
　Mrs. F. PAULI.